United States Patent [19]

McNeely

[11] Patent Number: 4,632,143

[45] Date of Patent: Dec. 30, 1986

[54] PRESSURE BOOST ATTACHMENT FOR PILOT VALVES

[75] Inventor: Michael D. McNeely, Katy, Tex.

[73] Assignee: Anderson, Greenwood & Co., Houston, Tex.

[21] Appl. No.: 802,324

[22] Filed: Nov. 27, 1985

[51] Int. Cl.⁴ .............................................. F16K 31/12
[52] U.S. Cl. ...................................... 137/488; 137/510
[58] Field of Search ......................... 137/488, 485, 510

[56] References Cited

U.S. PATENT DOCUMENTS

| | | | |
|---|---|---|---|
| 2,756,936 | 7/1956 | Mueller | 137/510 X |
| 3,083,726 | 4/1963 | Woelfel | 137/488 X |
| 3,754,566 | 8/1973 | Gemigniani | 137/488 |
| 4,312,374 | 1/1982 | Dowri | 137/510 X |
| 4,327,767 | 5/1982 | Fehrenbach | 137/510 |

Primary Examiner—Alan Cohan
Attorney, Agent, or Firm—Vinson & Elkins

[57] ABSTRACT

A fluid pressure boost attachment (18) is attached to a pilot valve (16) which senses the fluid pressure in a main flow line F. Upon restriction or blockage of fluid flow through inlet line (32) to pilot valve (16) the correct static fluid pressure is sensed in auxiliary fluid chamber (126) of boost attachment (18). Boost attachment (18) is actuated upon a predetermined pressure differential being reached between chambers (100) and (126) thereby to move actuator (120) and place intermediate fluid chamber (24) of pilot valve (16) in fluid communication with outlet fluid chamber (28) thereof.

13 Claims, 4 Drawing Figures

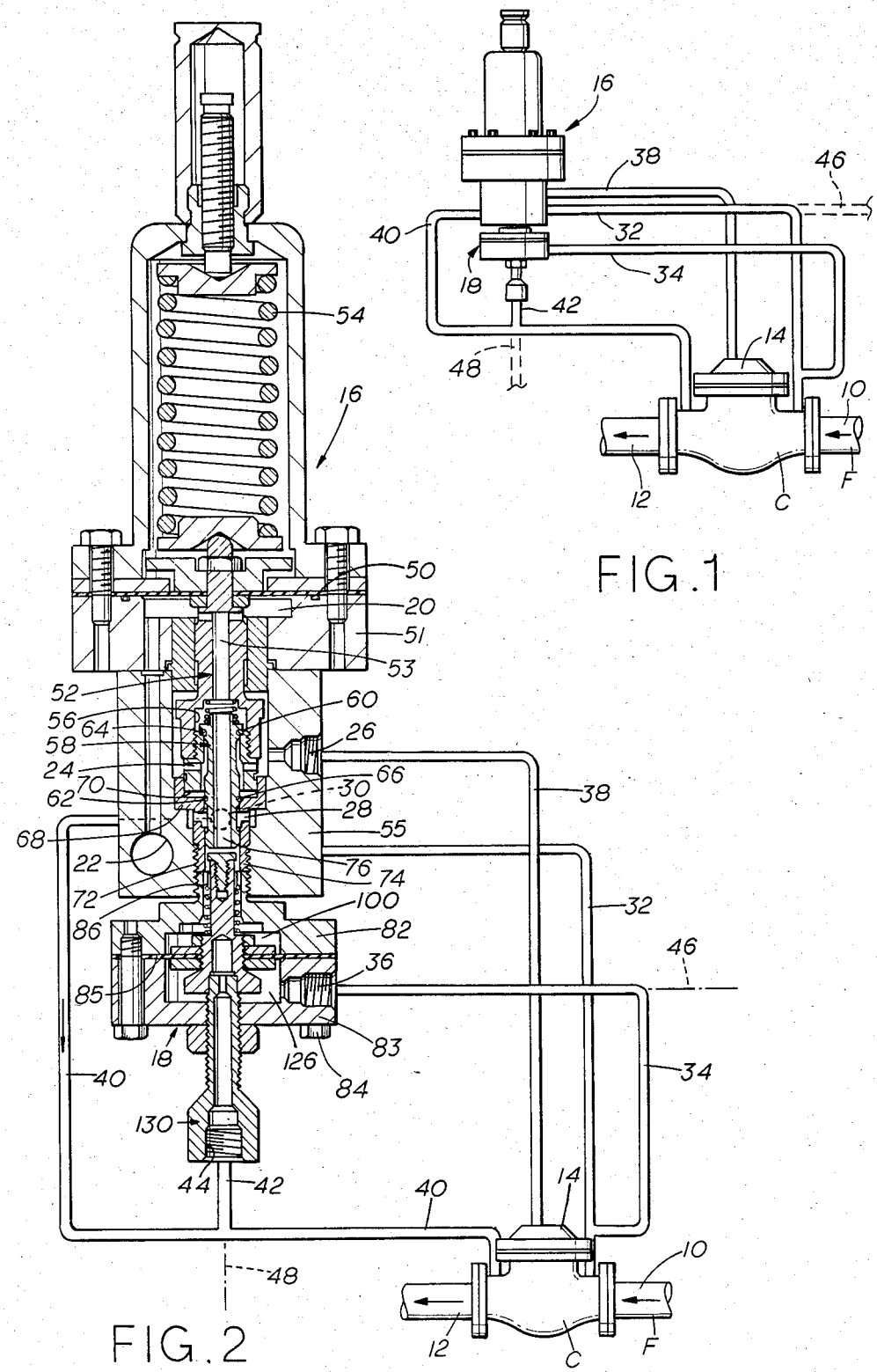

PRESSURE BOOST ATTACHMENT FOR PILOT VALVES

BACKGROUND OF THE INVENTION

This invention relates to a pilot valve for controlling a control valve in a main flow line, and more particularly to a fluid pressure boost attachment for the pilot valve.

Heretofore, such as illustrated in U.S. Pat. No. 3,572,359 dated Mar. 23, 1971, non-flowing pilot valves have been utilized to control a main valve in the main flow line for regulating a sensed or signal fluid pressure, either on the downstream side of the control valve or the upstream side of the control valve. The sensed fluid pressure being controlled is in fluid communication with a first fluid chamber in the pilot valve and in fluid communication with the flow line on one side of the control valve. A second fluid pressure chamber in the pilot valve is in fluid communication with the flow line on the other side of the control valve, and an intermediate fluid pressure chamber in the pilot valve is positioned between the first and second fluid pressure chambers. A spool valve member is movable between open and closed positions on valve seats separating the intermediate fluid chamber from the first and second fluid pressure chambers thereby controlling fluid flow between the chambers as desired under predetermined operating conditions.

Pilot valves are normally of two basic types, those that are adapted for use as pressure reducing valves to sense or control the downstream fluid pressure, or those adapted for use as a back pressure valve to sense or control the upstream fluid pressure. Aforementioned U.S. Pat. No. 3,572,359 shows embodiments for controlling or regulating both the upstream fluid pressure and the downstream fluid pressure.

It is noted that the response of the pilot valve is in response to a change in the pressure being sensed or controlled, and if for some reason such as a clogged filter, the fluid pressure being sensed or controlled is blocked in the line to the pilot valve, the control valve is not sufficiently responsive as the fluid pressure being sensed is inaccurate, and the control valve therefore receives an inaccurate pressure signal.

SUMMARY OF THE INVENTION

The present invention is particularly directed to an auxiliary attachment for a pilot valve controlling a control valve in a main flow line and sensing the pressure to be controlled in the main flow line. The sensed fluid from the main flow line or a fluid source, such as a tank, is normally communicated through a fluid filter prior to entering the pilot valve. At times, the filter may become clogged and thereby restrict or block the flow of inlet fluid or fluid being sensed through the pilot valve. When this occurs, particularly for a so-called modulating pilot valve which is highly sensitive and controls the flow of fluid through the control valve within well defined predetermined pressure ranges, an ineffective pilot valve results. There may be a blockage or restriction of the inlet fluid or fluid being sensed to the pilot valve for other reasons, such as freezing or the like. The present invention is particularly directed to an override mechanism which overcomes or compensates for such problems.

The auxiliary attachment of the present invention provides such an override mechanism which is attached to the pilot valve and includes a body having a diaphragm therein separating two auxiliary fluid pressure chambers, a lower auxiliary fluid pressure chamber in fluid communication with the main flow line upstream of the control valve, and the other or upper auxiliary fluid pressure chamber in fluid communication with the inlet fluid chamber in the pilot valve. When the inlet line to the pilot valve is not blocked or restricted, the fluid pressure in the inlet fluid chamber in the pilot valve is the same as the fluid pressure of the sensed fluid in the main flow line. Thus, the fluid pressure in the auxiliary fluid pressure chambers is the same or balanced, and the diaphragm is not exposed to any pressure differential or stressed.

A plunger or piston is connected to the diaphragm and upon a blockage or restriction of inlet fluid to the pilot valve, a reduction of fluid pressure occurs in the upper auxiliary fluid pressure chamber in fluid communication with the inlet fluid chamber resulting in an upward movement of the diaphragm along with the plunger. Upon upward movement of the plunger, the plunger engages an adjacent end of the spool valve in the pilot valve and pushes the spool valve upwardly to unseat the spool valve and provide fluid pressure communication between the control valve and the downstream flow line. Thus, an effective override mechanism is provided which is utilized to effect a change in the fluid control pressure to the control valve only when there is a restriction or blockage of the sensed or controlled fluid pressure to the pilot valve.

It is an object of the present invention to provide an auxiliary attachment for a pilot valve controlling a control valve in a main flow line which is effective only upon a restriction or blockage of fluid pressure from the main flow line to the inlet chamber of the pilot valve.

It is a further object of the invention to provide such an auxiliary attachment for a pilot valve which is effective to unseat a valve member in the pilot valve to provide fluid communication between the dome of the control valve and the flow line downstream of the flow line upon such blockage of fluid pressure to the pilot valve and subsequent rise in tank pressure to a predetermined value above the pressure at which the blockage to the pilot valve occurred.

An additional object of the present invention is to provide such an auxiliary attachment for a pilot valve in which a pair of auxiliary fluid pressure chambers are separated by a diaphragm and remain in a state of equilibrium or fluid balanced except when blockage of fluid occurs between the flow line and the pilot valve, at which time a pressure imbalance or differential occurs in the auxiliary chambers resulting in actuation of the auxiliary attachment and unseating of a spool valve member in the pilot valve.

Other objects, features, and advantages of this invention will become more apparent after referring to the following specification and drawings.

DESCRIPTION OF THE INVENTION

FIG. 1 is a schematic of a system for controlling a control valve in a main flow line in which the auxiliary boost valve attachment comprising the present invention is shown attached to a pilot valve for controlling fluid flow through the control valve;

FIG. 2 is a longitudinal section of the auxiliary boost valve and the pilot valve illustrated in FIG. 1 under normal operating conditions with the auxiliary boost valve in fluid balanced relation, and portions of the fluid system shown schematically;

Figure 3:
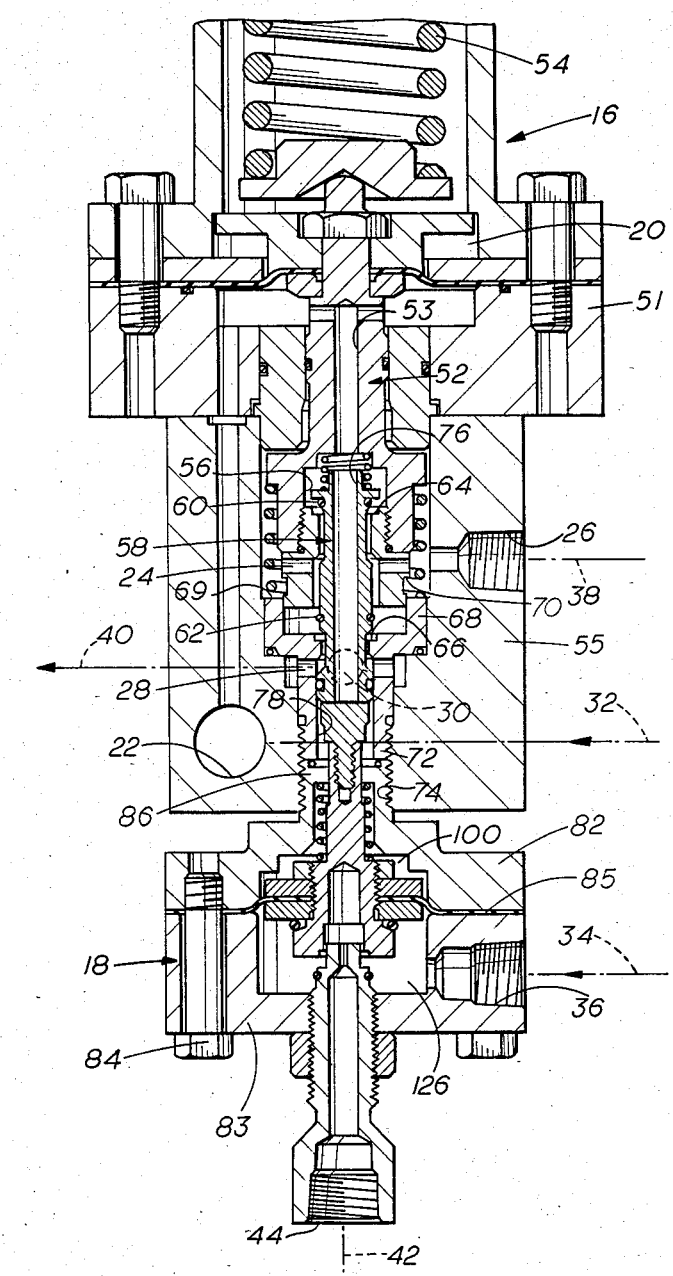
Figure 4:
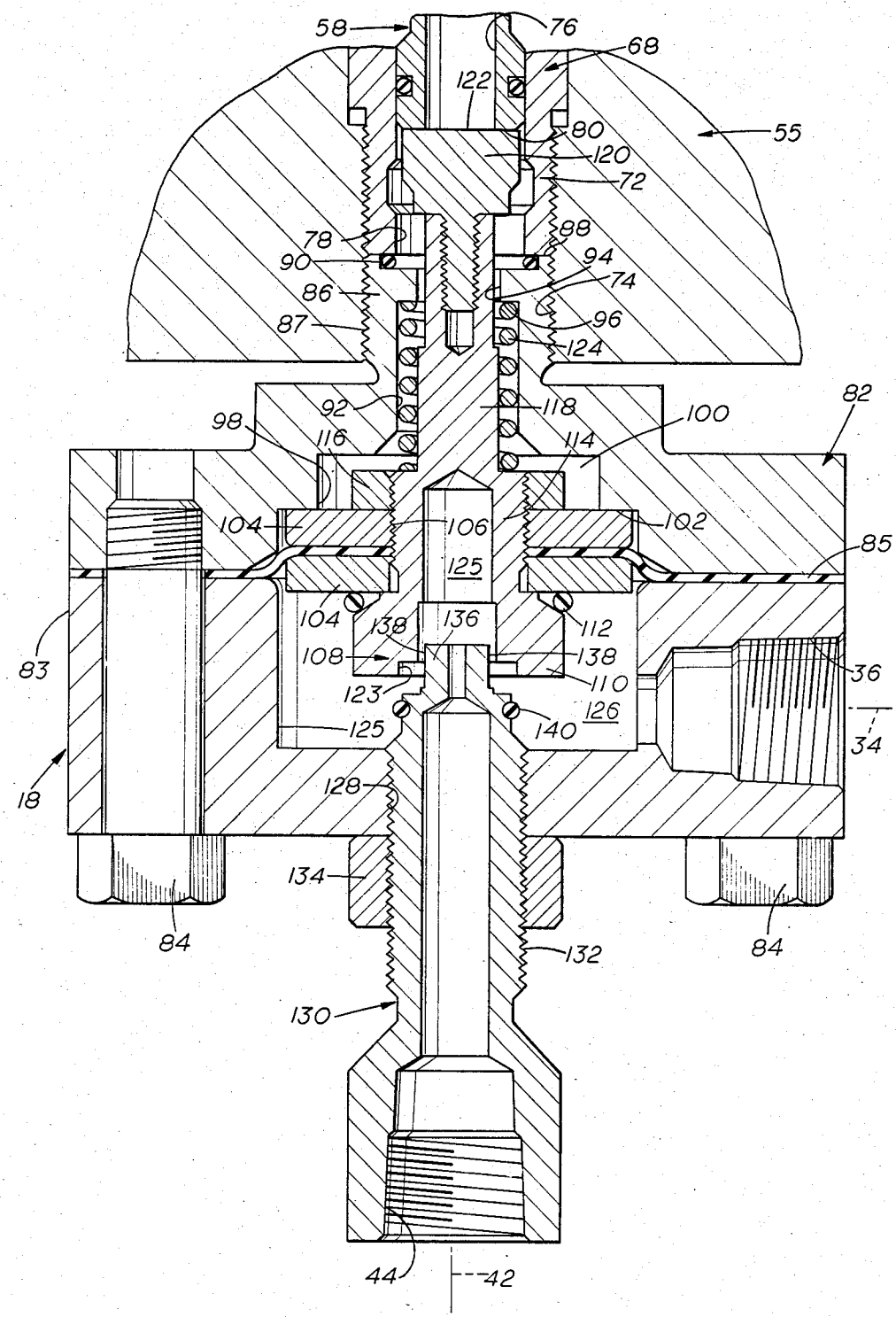

FIG. 3 is an enlarged fragment of FIG. 2 showing the auxiliary boost valve actuated with an unbalanced fluid pressure in the two auxiliary fluid pressure chambers; and FIG. 4 is an enlarged section of the auxiliary boost valve and a portion of the pilot valve shown in the actuated position of FIG. 3 with an unbalanced fluid pressure in the auxiliary fluid pressure chambers effecting unseating of a spool valve member in the pilot valve.

Referring now to the drawings for a better understanding of this invention, and more particularly to FIGS. 1 and 2, a typical system in which the present invention is adapted for use is illustrated and comprises a main flow line indicated at F with a control valve C therein for controlling the flow through flow line F. The upstream end of flow line F is indicated at 10 and the downstream end of flow line F is indicated at 12. The dome of control valve C is indicated at 14 and a pressure responsive element, such as a diaphragm, is normally positioned in dome 14 for controlling the flow of fluid through control valve C as well known in the art.

A typical pilot valve with which the present invention is used is shown generally at 16 and the auxiliary boost valve attachment comprising the present invention is shown generally at 18 attached to the lower end of pilot valve 16. Pilot valve 16 has an inlet fluid chamber 20 in fluid communication with a fluid inlet port 22, an intermediate fluid chamber 24 in fluid communication with an intermediate fluid port 26, and an outlet fluid chamber 28 in fluid communication with an outlet port 30. An inlet line 32 is connected to the upstream end 10 of flow line F and provides fluid to fluid inlet 22 for inlet chamber 20. Branch inlet line 34 leading from line 32 provides inlet fluid to an inlet port 36 on auxiliary valve attachment 18. An intermediate flow line 38 leads from dome 14 to intermediate port 26 for intermediate fluid chamber 24. An outlet flow line 40 extends from the downstream end 12 of flow line F to outlet port 30 for outlet chamber 28. A branch outlet line 42 extends to an outlet port or vent 44 for auxiliary valve attachment 18.

If desired, branch inlet line 34 for auxiliary valve attachment 18 may be connected to a fluid tank such as through line 46, instead of being in direct fluid communication with upstream end 10 of flow line F as shown. Port 44 may also be vented to atmosphere through line 48, if desired, rather than being in direct fluid communication with downstream end 12 of flow line F.

Pilot valve 16 includes a diaphragm 50 in upper body portion 51 and a piston member 52 secured to diaphragm 50 and urged downwardly by adjustable spring 54. Piston member 52 has a central bore 53 in fluid communication with inlet chamber 20 and extends downwardly within a central bore of a lower body portion 55. Received within an enlarged diameter bore portion 56 of bore 53 is a spool valve indicated generally at 58 having a pair of O-ring seals 60 and 62 thereabout for seating on respective seats 64 of piston 52 and fixed seat 66 of seat member 68. The upper end 69 of seat member 68 provides a stop for shoulder 70 on piston 52 to limit the downward movement of piston 52. Seat member 68 has an externally threaded lower end 72 threaded within the lower internally threaded central bore 74 of body portion 55.

In the position of pilot valve 16 shown in FIG. 2, O-ring seals 60 and 62 are seated on respective seats 64 and 66, thereby blocking fluid communication between intermediate fluid chamber 24, inlet fluid chamber 20, and outlet fluid chamber 28. When seal 60 is unseated, fluid communication is provided between intermediate fluid chamber 28 and inlet fluid chamber 20. When seal 62 is unseated, as in FIGS. 3 and 4, fluid communication is provided between intermediate fluid chamber 24 and outlet fluid chamber 28. Fluid pressure between pilot valve 16 and dome 14 of control valve C is controlled by the fluid communication of intermediate chamber 24 with fluid chamber 20 or outlet fluid chamber 28 under predetermined fluid pressure conditions thereby to provide a highly sensitive pilot valve 16. For further details of pilot valve 16 and its functioning, reference is made to copending application Ser. No. 774,809 filed Sept. 11, 1985, the entire disclosure of which is incorporated by this reference.

It is noted that spool valve 58 has a central bore 76 therethrough in fluid communication with central bore 53 of piston 52 and fluid inlet chamber 20 at all times. Seat 68 has a central bore 78 therethrough in continuous fluid communication with bore 76 of spool valve 58 and thus is in direct fluid communication with fluid inlet chamber 20 at all times.

Referring now to the auxiliary boost valve attachment 18 as shown in FIG. 4 and forming the present invention, an upper body 82 and a lower body 83 secured by threaded bolts 84 clamp a diaphragm 85 therebetween. Upper body 82 has an extension 86 externally threaded at 87 and received within internally threaded opening 74 of pilot valve body portion 55. End 88 of extension 86 is in abutting contact with the adjacent lower 72 end of fixed seat member 68 and an O-ring 90 seals therebetween. Upper body 82 has a central bore 92 therein and a restricted diameter bore portion 94 defined within extension 86 and defining a shoulder 96. An enlarged diameter bore portion 98 forms an upper auxiliary fluid chamber 100 therein and defines a shoulder 102. Auxiliary fluid chamber 100 is in direct fluid communication with inlet fluid chamber 20 of pilot valve 18 at all times through piston bore 53, bore 76 of spool valve 58, central bore 78 of fixed seat member 68, restricted bore portion 94, and bore 92.

Diaphragm 85 is clamped between a pair of annular plates 104 having internally threaded opening 106. A plunger member indicated generally at 108 has an enlarged diameter lower head 110 with an O-ring 112 between head 110 and adjacent plate 104. An externally threaded intermediate section 114 of plunger 108 fits within annular plates 104 and a lock nut 116 engages upper plate 104 to secure diaphragm 85 and plates 104 tightly on plunger 108. A small diameter end section 118 of plunger 108 has an actuator 120 thereon with an upper end surface 122 positioned adjacent end 80 of spool valve 58 and adapted to contact spool valve 58 upon actuation thereof, as will be explained. A compression spring 124 is biased between shoulder 96 and intermediate section 114 of plunger 108 to urge plunger 108 and diaphragm 85 lightly downwardly with a predetermined force. Plunger 108 forms a valve seat at 123 on the end of head 110, and a blind end bore 125 is provided in plunger 108 adjacent seat 123.

Lower body 83 has an enlarged diameter bore 125 forming auxiliary fluid chamber 126 and a small diameter threaded bore 128 which receives an externally threaded plug forming an adjustable seat member generally indicated at 130. Seat member 130 has external screw threads 132 engaging internally threaded opening 128 for axial adjustment of seat member 130. A lock nut 134 is provided for securing seat member 130 at a predetermined position. The inner end portion 136 of adjustable seat member 130 is received within bore 128 and has flats 138 along its outer circumference for providing a flow of fluid thereat. An O-ring seal 140 about seat member 130 is adapted to engage relatively sharp edged seat 123 on plunger 108 in the inoperable position of plunger 108 as shown in FIG. 2 to form a seal therebetween.

When pilot valve 16 is functioning properly, auxiliary valve attachment 18 is in a fluid balanced relation with the fluid pressure in auxiliary fluid chambers 100 and 126 being identical since auxiliary fluid chamber 100 is in direct fluid communication with fluid inlet chamber 20 of pilot valve 16 and auxiliary fluid chamber 126 is in fluid communication with inlet line 10. In this position, there is no stress on diaphragm 85 and auxiliary valve attachment 18 is inoperable. Since there is no stress on diaphragm 85 and no sliding seals or other moving elements, auxiliary valve attachment 18 may be held in readiness for an extended period of time, such as several years, and yet will be fully operable if needed.

In the event of a restriction or blockage of fluid flow through inlet line 32 to pilot valve 16, fluid pressure in inlet fluid chamber 20 would either become static and cease to change or significantly lag any pressure changes at inlet side 10 of flow line F. However, the correct static fluid inlet pressure from line 34 would be in auxiliary fluid chamber 126 and such static pressure could be higher than the pressure in fluid chamber 20 of pilot valve 16 and auxiliary chamber 100 of auxiliary valve attachment 18.

As an example, it is pointed out that the effective surface area of diaphragm 85 exposed to fluid pressure from chamber 126 is around ninety-two (92) percent of the effective surface area of diaphragm 85 exposed to fluid pressure from auxiliary fluid chamber 100, and this area differential is the area circumscribed by O-ring seal 140. Thus, there is an eight (8) percent area differential between auxiliary fluid chambers 100 and 126 acting on diaphragm 85 which along with the bias of spring 126 results in a downward seating force against O-ring 140. Thus, the pressure differential between chambers 100 and 126 at which plunger 108 will be actuated may be predetermined by the size of O-ring 140 and the bias of spring 124.

Upon an increase of pressure in chamber 126 to approximately eight (8) percent higher than the pressure trapped in chambers 20 and 100, and upon subsequent movement of diaphragm 85 and plunger 108 to the position shown in FIGS. 3 and 4, there is no area differential between chambers 100 and 126 acting on diaphragm 85 as O-ring seal 140 is unseated and the area circumscribed by O-ring seal 140 is now exposed to fluid pressure from chamber 126. Adjustable seat member 130 has flats 138 which permit a restricted fluid flow within bore 125 from chamber 126 upon the initial unseating of O-ring seal 140.

Upon a pressure differential between chambers 100 and 126 of around eight (8) percent, for example, a snap action of diaphragm 85 to the position of FIGS. 3 and 4 occurs, thereby moving plunger 108 and actuator 120 upwardly to engage the lower end 80 of valve spool 58 to unseat O-ring seal 62 from seat 66, thereby to place intermediate fluid chamber 24 in fluid communication with outlet fluid chamber 28. It is noted that upon the unseating of O-ring 62, a restricted flow of fluid is provided between intermediate fluid chamber 24 and inlet fluid chamber 20 by suitable flow restrictions between spool valve 58 and adjacent piston 52. A suitable visual indicator may be provided at a control panel to indicate the actuation of boost attachment 18 so that any necessary maintenance or repairs may be made.

From the above, it is apparent that that pressure boost attachment 18 provides an override mechanism which is utilized only when a restriction or blockage of fluid flow occurs to the fluid inlet chamber 20 of pilot valve 16.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A control assembly for controlling fluid flow through a control valve in a main flow line comprising:
   a pilot valve having a main bore therein including a first fluid chamber in fluid communication with the flow line on one side of the control valve for sensing the fluid pressure to be controlled, a second fluid chamber in fluid communication with the flow line on the other side of the control valve, and a third intermediate fluid chamber between said first and second fluid chambers in fluid communication with a fluid pressure responsive element in said control valve to effect movement thereof for changing fluid flow through said control valve;
   a valve member within said main bore for controlling fluid flow between said intermediate chamber and said first and second fluid chambers, said valve member movable between positions blocking and permitting fluid flow between the intermediate fluid chamber and said second fluid chamber;
   separate fluid pressure means associated with said pilot valve including a pair of auxiliary fluid chambers therein and a fluid pressure responsive member between said pair of auxiliary fluid chambers, one of said auxiliary fluid chambers being in continuous fluid communication with said first fluid chamber downstream thereof and the other of said auxiliary fluid chambers being in fluid communication with the main flow line; and
   means operatively connecting said fluid pressure responsive member to said valve member of said pilot valve for actuating said valve member upon the reaching of a predetermined fluid pressure differential between said auxiliary chambers to permit fluid flow between said intermediate fluid chamber and said second fluid chamber.

2. A control assembly as set forth in claim 1 wherein said separate fluid pressure means comprises a separate attachment removably connected to said pilot valve.

3. A control assembly as set forth in claim 1 wherein a valve seat is positioned between said intermediate fluid chamber and said second fluid chamber, and said valve member within said main bore comprises a spool valve movable between seated and unseated position relative to said valve seat;
   said fluid pressure responsive member of said separate fluid pressure means contacting said spool valve to unseat said spool valve upon the reaching of the predetermined pressure differential in said auxiliary fluid chambers.

4. A control assembly as set forth in claim 3 wherein said fluid pressure responsive member comprises a diaphragm separating said auxiliary fluid chambers, and a plunger secured to said diaphragm contacts an end of said spool valve for unseating said spool valve.

5. A control assembly for controlling fluid flow through a control valve in a main flow line comprising:
   a pilot valve including an inlet fluid chamber in fluid communication with the flow line upstream of the control valve for sensing the inlet fluid pressure to be controlled, an outlet fluid chamber in fluid communication with the flow line downstream of the control valve, and an intermediate fluid chamber between said inlet and outlet fluid chambers in fluid communication with said control valve;
   a valve seat between said outlet fluid chamber and said intermediate fluid chamber;
   a valve member between said outlet fluid chamber and said intermediate fluid chamber movable between open and closed positions relative to said valve seat;
   separate fluid pressure means associated with said pilot valve including a pair of auxiliary fluid chambers therein and a fluid pressure responsive member between said pair of auxiliary fluid chambers, one of said auxiliary fluid chambers being in continuous fluid communication with said fluid inlet chamber downstream thereof and the other of said auxiliary fluid chambers being in fluid communication with the main flow line upstream of said control valve; and
   means operatively connecting said fluid pressure responsive member to said valve member for moving said valve member to open position upon the reaching of a predetermined fluid pressure differential between said auxiliary chambers thereby to permit fluid flow between said intermediate fluid chamber and said outlet fluid chamber.

6. A control assembly as set forth in claim 5 wherein said fluid pressure responsive member comprises a diaphragm separating said auxiliary fluid chambers with the fluid pressure in said auxiliary fluid chambers being balanced in the inoperable position of said separate fluid pressure means.

7. A control assembly as set forth in claim 5 wherein said pilot valve has a central bore therein with an internally threaded end;
   and said separate fluid pressure means has an externally threaded extension thereon threaded within the end of said central bore to provide a removable connection therebetween.

8. A control assembly as set forth in claim 7 wherein said valve member comprises a spool valve mounted within the central bore of said pilot valve;
   and said fluid pressure responsive member of said separate fluid pressure means comprises a diaphragm, and a plunger secured to said diaphragm extends within said central bore to unseat said spool valve upon reaching of said predetermined fluid pressure differential.

9. In combination with a pilot valve having an inlet fluid chamber in fluid communication with an upstream flow line for sensing the fluid pressure to be controlled, an outlet fluid chamber in fluid communication with the downstream flow line, and an intermediate fluid chamber between said inlet and outlet fluid chambers in fluid communication with a control valve in the flow line;
   an auxiliary boost valve removably attached to said pilot valve; said auxiliary boost valve comprising:
   a body having a diaphragm therein separating two auxiliary fluid pressure chambers, one auxiliary fluid pressure chamber adapted to be in fluid communication with the upstream flow line, the other auxiliary fluid pressure chamber adapted to be in fluid communication with the inlet fluid chamber in said pilot valve;
   the fluid pressure in said auxiliary fluid pressure chamber being balanced when the fluid pressure in the inlet fluid chamber in said pilot valve is the same as the fluid pressure in the upstream flow line; and
   actuating means operatively connected to said diaphragm and being actuated upon a predetermined pressure differential being reached between said auxiliary fluid pressure chambers, said actuating means upon actuation thereof effecting fluid communication between the fluid outlet chamber of the pilot valve and said intermediate fluid pressure chamber for changing the fluid control pressure to the control valve.

10. The combination as set forth in claim 9 wherein said actuating means comprises a plunger secured to the diaphragm and extending within the pilot valve for actuation of the pilot valve upon the reaching of the predetermined pressure differential in said auxiliary fluid pressure chambers.

11. In combination with a pilot valve having an inlet fluid chamber in fluid communication with a main flow line for sensing fluid pressure therein, an outlet fluid chamber, an intermediate fluid chamber between the inlet and outlet fluid chambers, and a movable valve member in the intermediate fluid chamber to control fluid flow between the intermediate fluid chamber and the outlet fluid chamber;
   an auxiliary boost valve connected to said pilot valve for actuating said movable valve member in the pilot valve upon predetermined pressure conditions in said boost valve; said auxiliary boost valve comprising:
   a body adjacent said pilot valve having a diaphragm therein separating two auxiliary pressure chambers, one of said auxiliary fluid chambers being in fluid communication with said inlet fluid chamber and the other auxiliary fluid chamber being in fluid communication with said main flow line;
   a plunger secured to said diaphragm within said one auxiliary pressure chamber and having one end extending from said body within said pilot valve to a position adjacent said movable valve member, said plunger and said boost valve being inoperable when the fluid pressures in said auxiliary pressure chambers are balanced and being operable only when the fluid pressures in said auxiliary pressure chambers are unbalanced;
   said plunger moving away from said body toward said pilot valve upon a predetermined higher fluid pressure being reached in the other auxiliary pressure chamber for contacting said movable valve member in said pilot valve and moving said valve member upon such predetermined higher fluid pressure being reached to a position in which fluid communication is provided between said intermediate fluid chamber and said outlet fluid chamber.

12. The combination as set forth in claim 11 wherein means secured to said diaphragm within the other fluid pressure chamber has an annular valve seat thereon; and an adjustable sealing member within said other fluid pressure chamber seats against said valve seat in the inoperable position of said boost valve in which the fluid pressures in said auxiliary pressure chambers are balanced, and said annular valve seat and said sealing member cooperate to provide a fluid pressure responsive area in said other fluid pressure chamber smaller than the fluid pressure responsive area in said one fluid pressure chamber when the sealing member is seated against said valve seat; said valve seat being unseated from said adjustable sealing member upon the movement of the diaphragm and plunger when the predetermined higher fluid pressure is reached in said other auxiliary pressure chamber.

13. The combination as set forth in claim 12 wherein said adjustable sealing member has a central bore therethrough in fluid communication with a fluid pressure source, said other fluid pressure chamber being in fluid communication with said adjustable sealing member when said valve seat is unseated from said adjustable sealing member.

* * * * *